(12) United States Patent　(10) Patent No.: US 12,629,734 B2
Turner et al.　(45) Date of Patent: May 19, 2026

(54) FUME EXTRACTORS FOR ROBOTIC WELDING TORCHES

(71) Applicant: Illinois Tool Works Inc., Glenview, IL (US)

(72) Inventors: Adam Turner, Belle River (CA); Jeffrey Wells, Belle River (CA)

(73) Assignee: Illinois Tool Works Inc., Glenview, IL (US)

( * ) Notice: Subject to any disclaimer, the term of this patent is extended or adjusted under 35 U.S.C. 154(b) by 766 days.

(21) Appl. No.: 17/990,202

(22) Filed: Nov. 18, 2022

(65) Prior Publication Data

US 2023/0182183 A1　Jun. 15, 2023

Related U.S. Application Data

(60) Provisional application No. 63/322,106, filed on Mar. 21, 2022, provisional application No. 63/289,383, filed on Dec. 14, 2021.

(51) Int. Cl.
*B08B 15/04*　(2006.01)
*B23K 37/006*　(2025.01)
*B25J 19/00*　(2006.01)

(52) U.S. Cl.
CPC ............ *B08B 15/04* (2013.01); *B23K 37/006* (2013.01); *B25J 19/0029* (2013.01)

(58) Field of Classification Search
CPC ... B08B 15/04; B25J 19/0058; B25J 19/0075; B25J 19/0079; B23K 37/006; B23K 26/70; B23K 26/706; B23K 9/328; B23Q 11/0042
See application file for complete search history.

(56) References Cited

U.S. PATENT DOCUMENTS

| 3,798,409 A | 3/1974 | Troyer |
| 5,015,822 A | 5/1991 | Mann |
| 5,079,404 A | 1/1992 | Zamuner |

(Continued)

FOREIGN PATENT DOCUMENTS

| DE | 102007035108 | 2/2008 |
| EP | 0502421 | 9/1992 |

(Continued)

OTHER PUBLICATIONS

European Office Communication with extended Search Report Appln No. 22210812.8 dated Jun. 20, 2023.

(Continued)

*Primary Examiner* — Justin C Dodson

(74) *Attorney, Agent, or Firm* — McAndrews, Held & Malloy, Ltd.

(57) ABSTRACT

An example fume extractor for a robotic welding torch includes: a neck clamp configured to attach to a neck of a robotic welding torch; an intermediate mount rigidly attached to the neck clamp; a fume duct coupled to the intermediate mount and extending over the neck of the robotic welding torch toward a nozzle of the robotic welding torch; and a fume manifold rotationally coupled to the intermediate mount and coupled to a fume hose, wherein the fume manifold, the intermediate mount, and the fume duct are configured to communicate a negative pressure from the fume hose to an end of the fume duct closest to the nozzle of the robotic welding torch.

20 Claims, 12 Drawing Sheets

(56) References Cited

U.S. PATENT DOCUMENTS

| | | | |
|---|---|---|---|
| 5,811,055 A | 9/1998 | Geiger | |
| 6,244,519 B1 | 6/2001 | Hayakawa | |
| 7,544,914 B2 | 6/2009 | Zamuner | |
| 8,592,710 B2 | 11/2013 | Klangos | |
| 8,872,056 B2 | 10/2014 | Klangos | |
| 9,180,547 B2 | 11/2015 | Brenneke | |
| 9,802,266 B2 | 10/2017 | Moons | |
| 9,846,439 B2 | 12/2017 | Carman | |
| 2009/0107970 A1 | 4/2009 | Norrish | |
| 2009/0321403 A1 | 12/2009 | Brenneke | |
| 2010/0276396 A1 | 11/2010 | Cooper | |
| 2013/0244560 A1* | 9/2013 | Hammers | B08B 15/002 454/63 |
| 2015/0014291 A1 | 1/2015 | Holmes | |
| 2017/0225257 A1* | 8/2017 | Lapelosa | B23K 37/00 |
| 2018/0339358 A1 | 11/2018 | Hattingh | |
| 2019/0001381 A1 | 1/2019 | Hattingh | |

FOREIGN PATENT DOCUMENTS

| EP | 2298485 | 3/2011 |
|---|---|---|
| EP | 2556913 | 2/2013 |
| EP | 2556914 | 2/2013 |
| EP | 3300827 | 4/2018 |
| EP | 3804898 | 4/2021 |
| EP | 3825053 | 5/2021 |
| GB | 2466254 | 6/2010 |
| JP | H0513671 | 1/1993 |
| JP | H09267178 | 10/1997 |
| JP | 2000063236 | 2/2000 |
| JP | 2002096173 | 4/2002 |
| JP | 3501581 | 3/2004 |
| JP | 2008012584 | 1/2008 |
| KR | 200466953 | 5/2013 |
| KR | 20210069938 | 6/2021 |
| WO | 9107249 | 5/1991 |
| WO | 2021030395 | 2/2021 |

OTHER PUBLICATIONS

Int'l Search Report and Written Opinion Appln No. PCT/US2020/045861 mailed Dec. 8, 2020.

* cited by examiner

FUME EXTRACTORS FOR ROBOTIC WELDING TORCHES

FIELD OF THE DISCLOSURE

This disclosure relates generally to fume extraction, and more particularly to fume extractors for robotic welding torches.

BACKGROUND

Welding operations result in substantial fumes which, if not captured, disperse into the local environment (e.g., room, building) in which the welding operations are occurring. Such fumes or other airborne components may be dissipated, or captured and filtered from the air.

Different types of fume extraction systems have been developed. Some types of fume extractors filter fume from ambient air, which generally requires the fumes to have dispersed into the local environment in which the filter is located. Some other types of fume extractors include localized collection devices, which can be positioned to collect air and fume from a more localized volume within which the fumes originate, thereby increasing capture efficiency. In the welding context, such localized fume extractors can be coupled or attached to a welding torch to generally follow a fume-producing arc welding operation, or can be positioned independently from the welding torch.

SUMMARY

Fume extractors for robotic welding torches are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
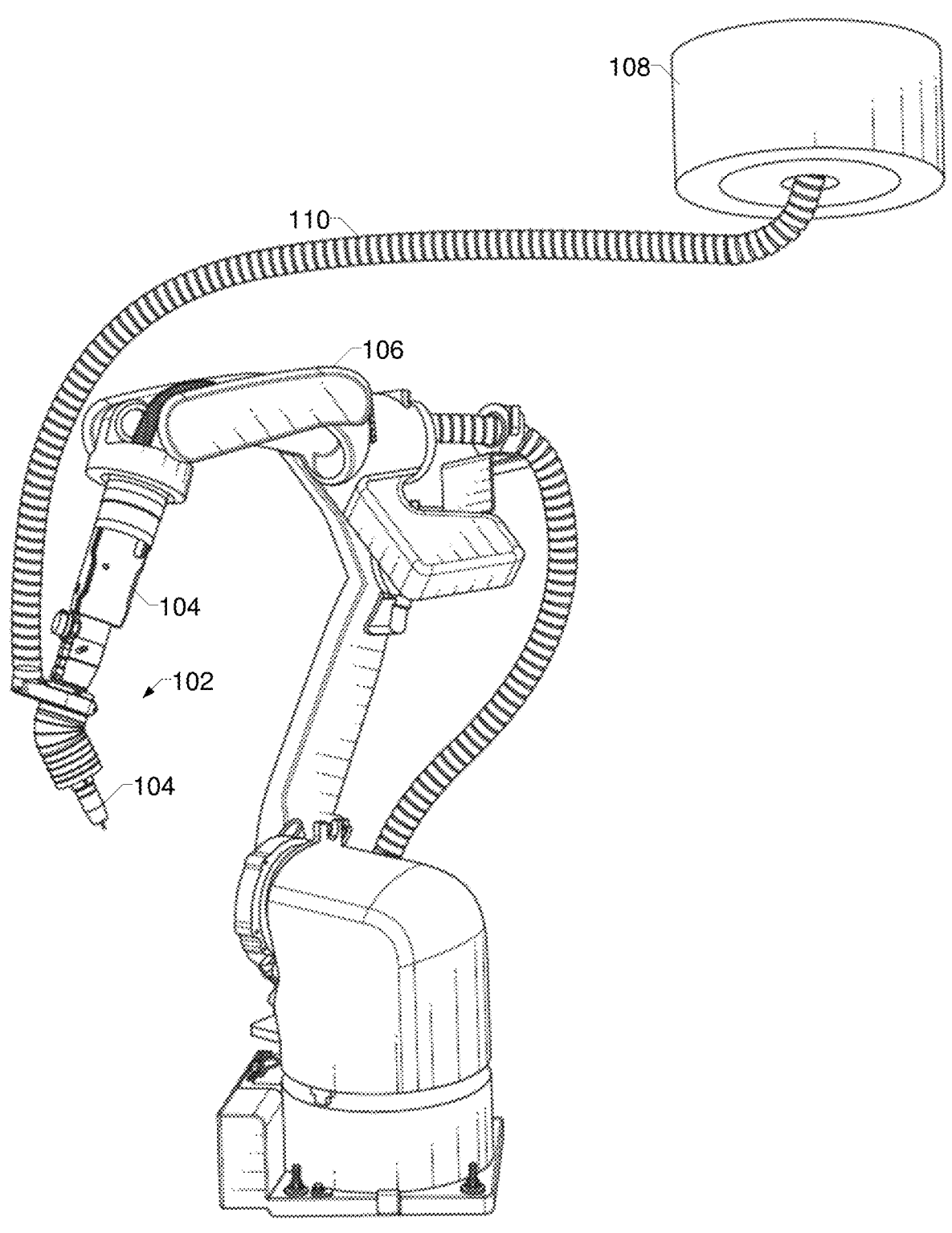
FIG. 1 illustrates an example robotic welding torch including a fume extraction system attached to the welding torch, in accordance with aspects of this disclosure.

Disclosed example fume extractors provide improved fume at the point of fume generation extraction for robotic welding torches. In disclosed examples, a fume extractor is attachable to through-arm and/or conventional-type robotic welding torches, in which the fume extractor is capable of the same degree of rotation as the welding torch, without entanglement of fume hoses. Rotation of the neck of the welding torch causes corresponding rotation of a fume duct adjacent the nozzle, which initially captures the fumes for collection and filtering. Disclosed example fume extractors allow for improved fume extraction efficiency by locating the fume extraction closer to the arc, while retaining enhanced welding torch access (e.g., reduced collision envelope) relative to conventional robotic fume extraction techniques.

Additionally, disclosed fume extractors may be adapted to multiple different types of robotic welding torches and/or robotic manipulators, which may include welding torches having liquid cooling lines extending along the neck. Disclosed example fume extractors are easily installed and removed from the welding torch, reducing downtime of the robotic welding system 100 to install, remove, and/or replace components of the fume extractor.

Disclosed example fume extractors for robotic welding torches include: a neck clamp configured to attach to a neck of a robotic welding torch; an intermediate mount rigidly attached to the neck clamp; a fume duct coupled to the intermediate mount and extending over the neck of the robotic welding torch toward a nozzle of the robotic welding torch; and a fume manifold rotationally coupled to the intermediate mount and coupled to a fume hose, wherein the fume manifold, the intermediate mount, and the fume duct are configured to communicate a negative pressure from the fume hose to an end of the fume duct closest to the nozzle of the robotic welding torch.

In some example fume extractors, the neck clamp is configured to rotate, and induce corresponding rotation of the intermediate mount and the fume duct, in response to rotation of the neck of the robotic welding torch. In some example fume extractors, the neck clamp, the intermediate mount, and the fume duct are capable of rotation of more than 360 degrees with respect to the fume manifold.

In some example fume extractors, the robotic welding torch is a through-arm robotic welding torch in which weld cables coupled to the robotic welding torch are routed at least partially through an interior of a robotic welding arm.

In some example fume extractors, the robotic welding torch includes weld cables coupled to the robotic welding torch and routed on an exterior of a robotic welding arm. In some example fume extractors, the fume duct extends from the intermediate mount around the bend in the neck toward the nozzle of the robotic welding torch.

In some example fume extractors, the fume duct is concentric to the neck of the robotic welding torch. In some example fume extractors, the fume duct is configured to deflect in response to a collision between the fume duct and an external surface, and to return to a predefined shape when the external surface is removed.

In some example fume extractors, the neck clamp includes one or more openings for fluid lines to pass through the neck clamp. In some example fume extractors, the neck clamp includes two or more pieces configured to be attached together to clamp to the neck of the robotic welding torch. In some example fume extractors, the intermediate mount includes a plurality of circumferentially spaced openings, and the fume manifold is configured to, based on a relative rotational position between the fume manifold and the intermediate mount, direct fume to the fume hose via one or more of the openings and obstruct others of the openings.

Some example fume extractors further include a fume collection shroud positioned within an annulus between the fume duct and the neck of the welding torch. In some example fume extractors, the fume collection shroud is configured to retain the fume duct in a concentric position with the neck of the welding torch. In some example fume extractors, the fume collection shroud includes a plurality of vanes or baffles configured to reduce turbulence of airflow entering the fume duct via the fume collection shroud. In some example fume extractors, the fume collection shroud includes a rigid frame ring and an inner centering bumper. In some example fume extractors, the inner centering bumper includes a plurality of cushion sections spaced about an inner diameter of the inner centering bumper, and the plurality of cushion sections resiliently deform in response to an external force applied to the rigid frame ring.

In some example fume extractors, an interface between the intermediate mount and the fume manifold includes one or more detents, and the fume manifold is configured to overcome resistive force applied by the detent to rotate with respect to the intermediate mount when at least a threshold rotational force is applied between the intermediate mount and the fume manifold. In some example fume extractors, the fume manifold is a flexible or semi-rigid material. In some example fume extractors, the fume manifold includes a rigid flange or bushing to interface with the intermediate mount. In some example fume extractors, the fume manifold includes a rigid flange or bushing to interface with the fume hose.

FIG. 1 illustrates an example robotic welding system 100 including a fume extraction system 102 attached to a welding torch 104. The example robotic welding system 100 includes a robotic manipulator 106, such as a through-arm type manipulator (e.g., cables are routed at least partially internally to the manipulator 106) or a conventional manipulator (e.g., cables are routed externally to the manipulator 106). The welding torch 104 is attached to the manipulator 106 for positioning the welding torch 104 during welding operations.

Welding operations generate substantial fumes which, if not captured, disperse into the local environment (e.g., room, building) in which the welding operations are occurring. To effectively capture and dispose of welding fumes generated via the welding torch, a fume extraction system 102 is attached to the welding torch 104 to capture welding fumes close to the point of emission of the fumes. Because the fume extraction system 102 is attached to the welding torch 104, the fume extraction system 102 moves with the welding torch 104 as the manipulator 106 conducts the welding operations.

The fume extraction system 102 is connected to a suction source or fume capture system 108 via a fume hose 110. The fume hose 110 communicates negative pressure from the fume capture system 108 to the fume extraction system 102, and directs captured fume from the fume extraction system 102 to the fume capture system 108. Robotic manipulators and, in particular, through-arm robotic manipulators are capable of significant rotation of the welding torch 104 during welding operations. Conversely, the fume capture system 108 is typically stationary. The example fume extraction system 102 of FIG. 1 allows the fume hose 110 to remain attached to the fume extraction system 102 while the welding torch 104 is moved and rotated during welding operations. The fume extraction system 102 also follows a curvature in the neck of the welding torch 104 to position the intake of the fume extraction system 102 in an advantageous position, even as the welding torch 104 is moved and rotated during welding operations.

Figure 2A:
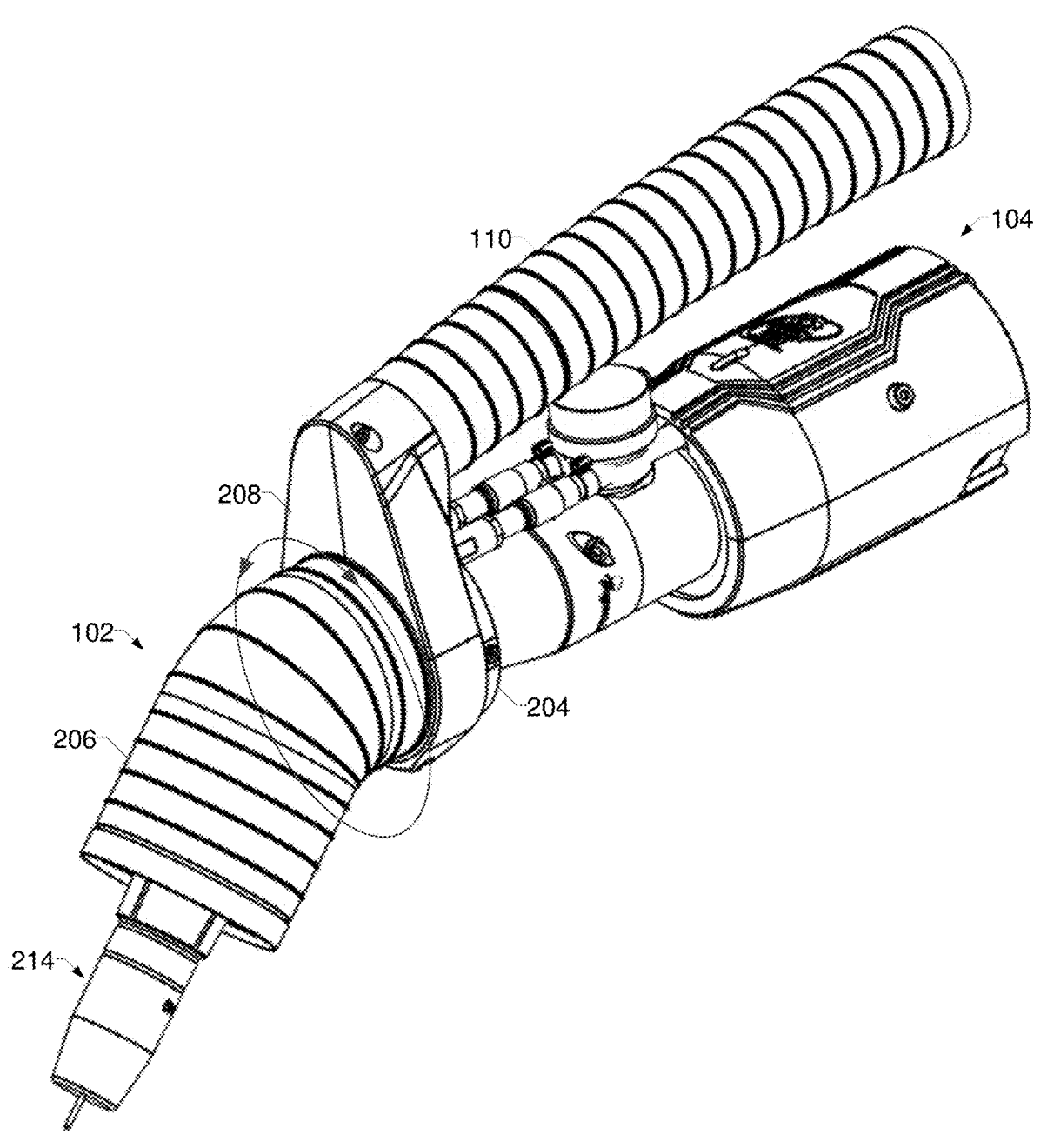
FIG. 2A illustrates an example implementation of the fume extraction system of FIG. 1 attached to a through-arm welding torch, in accordance with aspects of this disclosure.
Figure 3:
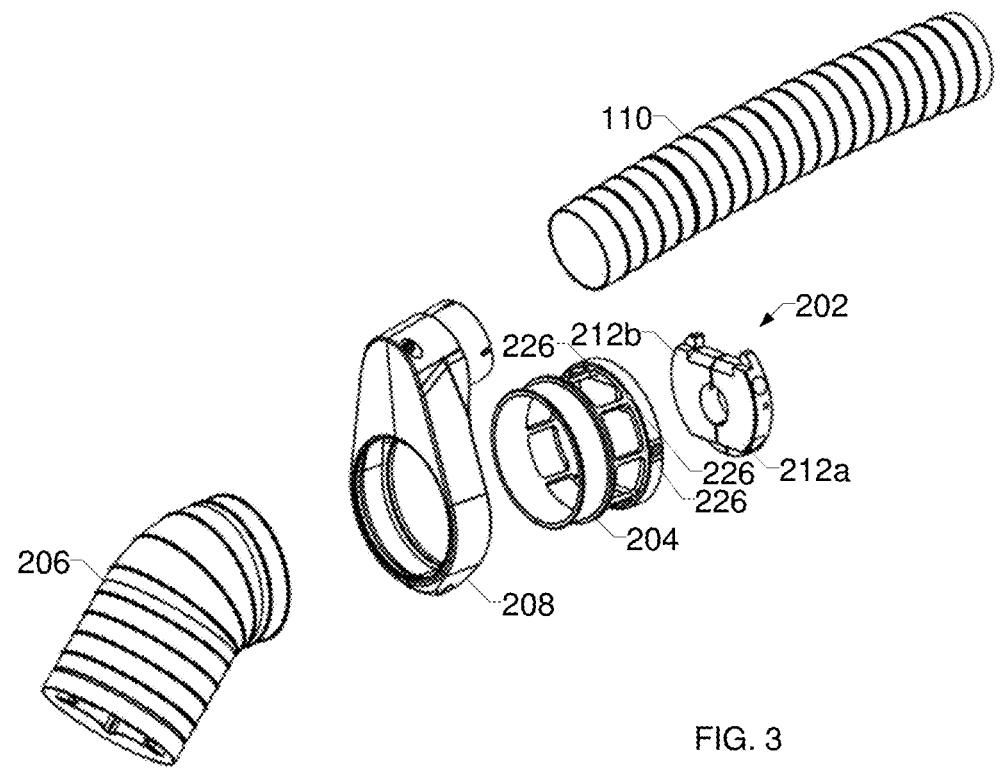
FIG. 3 is a partially exploded view of the example fume extraction system of FIG. 2A.

FIG. 2A is a block diagram of an example implementation of the fume extraction system 102 of FIG. 1 attached to a through-arm welding torch 104. FIG. 3 is a partially exploded view of the example fume extraction system of FIG. 2A. As illustrated in FIGS. 2A and 3, the example fume extraction system 102 includes a neck clamp 202, an intermediate mount 204, a fume duct 206, and a fume manifold 208.

Figures 4, 5:
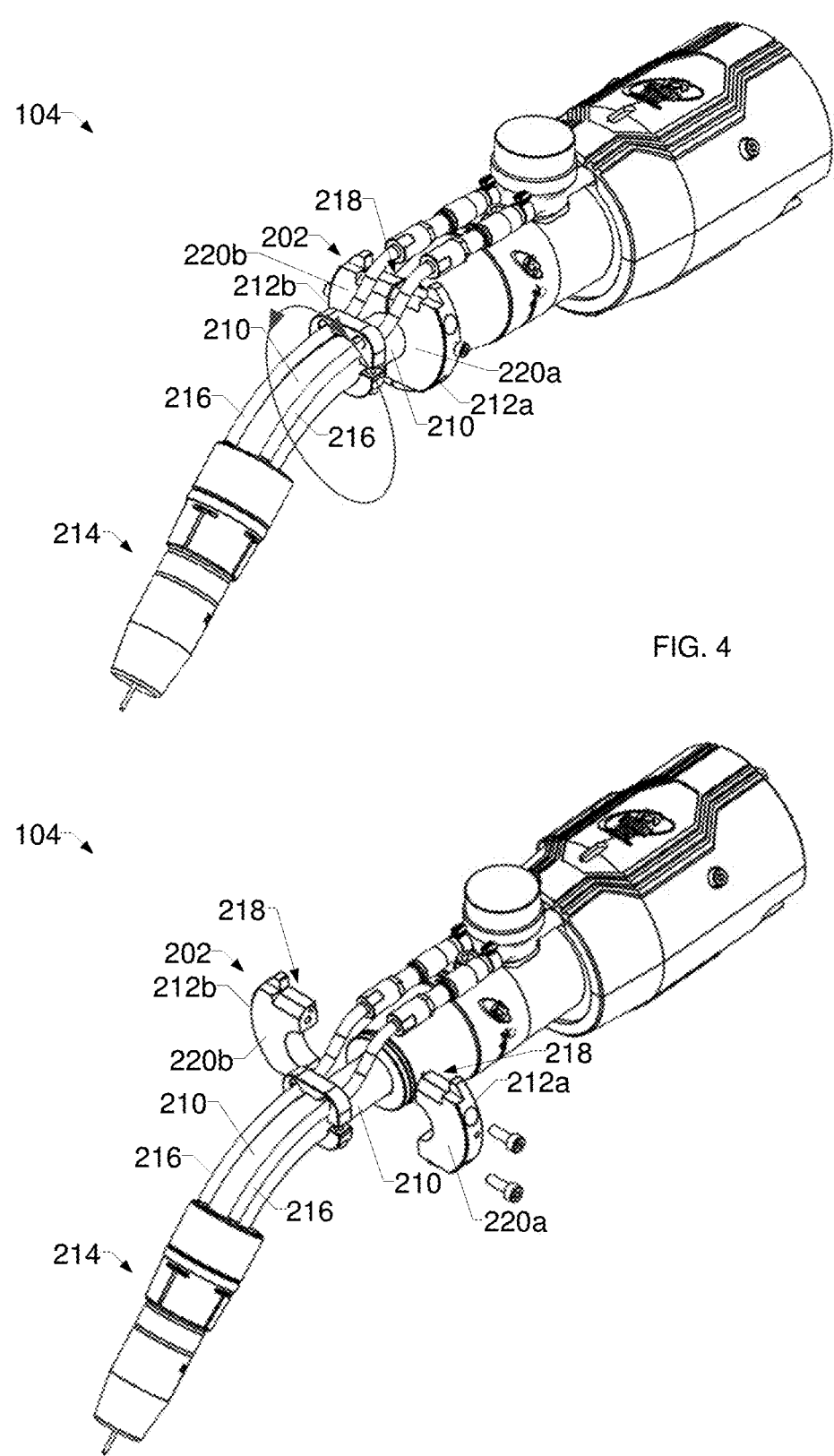
FIG. 4 is a perspective view of a neck clamp of the fume extraction system of FIG. 2A attached to the neck of the welding torch.
FIG. 5 is a partially exploded view of the neck clamp of the fume extraction system of FIG. 2A arranged to be attached to the neck of the welding torch.

The neck clamp 202 attaches to a neck 210 of a robotic welding torch 104. For example, the neck clamp 202 may include multiple pieces 212a, 212b which are attached around the neck 210 to secure the neck clamp 202 in place such that the rotation of the neck 210 likewise rotates the neck clamp 202. FIG. 4 is a perspective view of the neck clamp 202 of the attached to the neck 210 of the welding torch 104. FIG. 5 is a partially exploded view of the neck clamp 202, including example pieces 212a, 212b, arranged to be attached to the neck 210 of the welding torch 104. The clamp pieces 212a, 212b may be connected by one or more screws or other fasteners, by a hinge and clamp, multiple clamps, retaining rings, clips, and/or any other method of connecting the clamp pieces 212a, 212b.

The example intermediate mount 204 is rigidly (e.g., non-rotatably) attached to the neck clamp 202. The intermediate mount 204 provides a mounting point for both the fume duct 206 and the fume manifold 208, and transfers the weight of both the fume duct 206 and the fume manifold 208 to the neck 210 via the neck clamp 202. The intermediate mount 204 may be attached to the circumference of the neck clamp 202 via one or more fasteners (e.g., screws), by a hinge and clamp, multiple clamps, retaining rings, clips, and/or any other method of connecting the intermediate mount 204 to the clamp 202.

In the illustrated example, the welding torch 104 is liquid-cooled, with fluid lines 216 extending along and adjacent the neck to a nozzle assembly 214. To accommodate the fluid lines 216, the example neck clamp 202 and/or the intermediate mount 204 may include a cutout 218, or aperture, to allow for securing the neck clamp 202 and/or the intermediate mount 204 onto the neck 210 without interference by the fluid lines 216. In some examples, the cutout 218 may be at least partially sealed between the fluid lines 216 and the neck clamp 202 using, for example, a foam rubber seal, brush stripping, and/or any other type of sealing device. Sealing the cutout 218 around the fluid lines 216 may further improve fume capture by improving negative pressure at the fume duct 206.

The example fume duct 206 is coupled to the intermediate mount 204 and extends over the neck 210 of the robotic welding torch 104 toward the nozzle assembly 214 of the robotic welding torch. The fume duct 206 is connected to a cylindrical mounting surface of the intermediate mount 204 using, for example, a hose clamp. In other examples, the outer diameter of the intermediate mount 204 may be larger than an inner dimeter of the fume duct 206, and the fume duct 206 is stretched over the mounting surface of the intermediate mount 204 and is retained by compression. Because the fume duct 206 is attached to the intermediate mount 204, the fume duct 206 rotates in a same direction of rotation as the neck 210 and the nozzle assembly 214. In particular, the neck clamp 202, the fume duct 206, and the intermediate mount 204 may rotate the full range of rotation (e.g., more than 360 degrees, unlimited rotation, or less than 360 degrees, depending on the type of welding torch 104 and manipulator 106).

The example fume manifold 208 is rotationally coupled to the intermediate mount 204 and is coupled to the fume hose 110. The fume manifold 208, the intermediate mount 204, and the fume duct 206 communicate a negative pressure from the fume hose 110 (e.g., from the fume capture system 108 of FIG. 1) to an end of the fume duct 206 closest to the nozzle assembly 214.

The example fume hose 110 may be secured to the manipulator 106 in any desired manner that permits the fume hose 110 to remain secured to the fume extraction system 102. In particular, the fume hose 110 is attached such that the fume hose 110 has a same positional and rotational relationship with the robotic manipulator 106 as the fume manifold 208, such that the fume hose 110 is not caused to rotate with portions of the manipulator 106 in a different manner than the fume manifold 208. For example, the fume hose 110 is not rigidly attached to components that share a same rotation axis with the torch 104 (e.g., below the J6 axis), but may be attached to portions of the robot that cause movement of the torch 104 (e.g., above the J6 axis).

The example neck clamp 202 of FIG. 2A has a solid surface (e.g., surfaces 220a, 220b) which helps block fume from escaping the intermediate mount 204 and fume manifold 208. The neck clamp 202 may be clamped to welding torches that include cooling lines and to torches that omit cooling lines. Additionally or alternatively, the neck clamp 202 may be substituted with different neck clamps to fit different welding torches having different neck sizes. For example, while the inner clamping surface may have different diameters to fit different neck diameters, the outer circumference of different neck clamps may remain the same to allow use of the same intermediate mount 204.

Figures 6, 7:
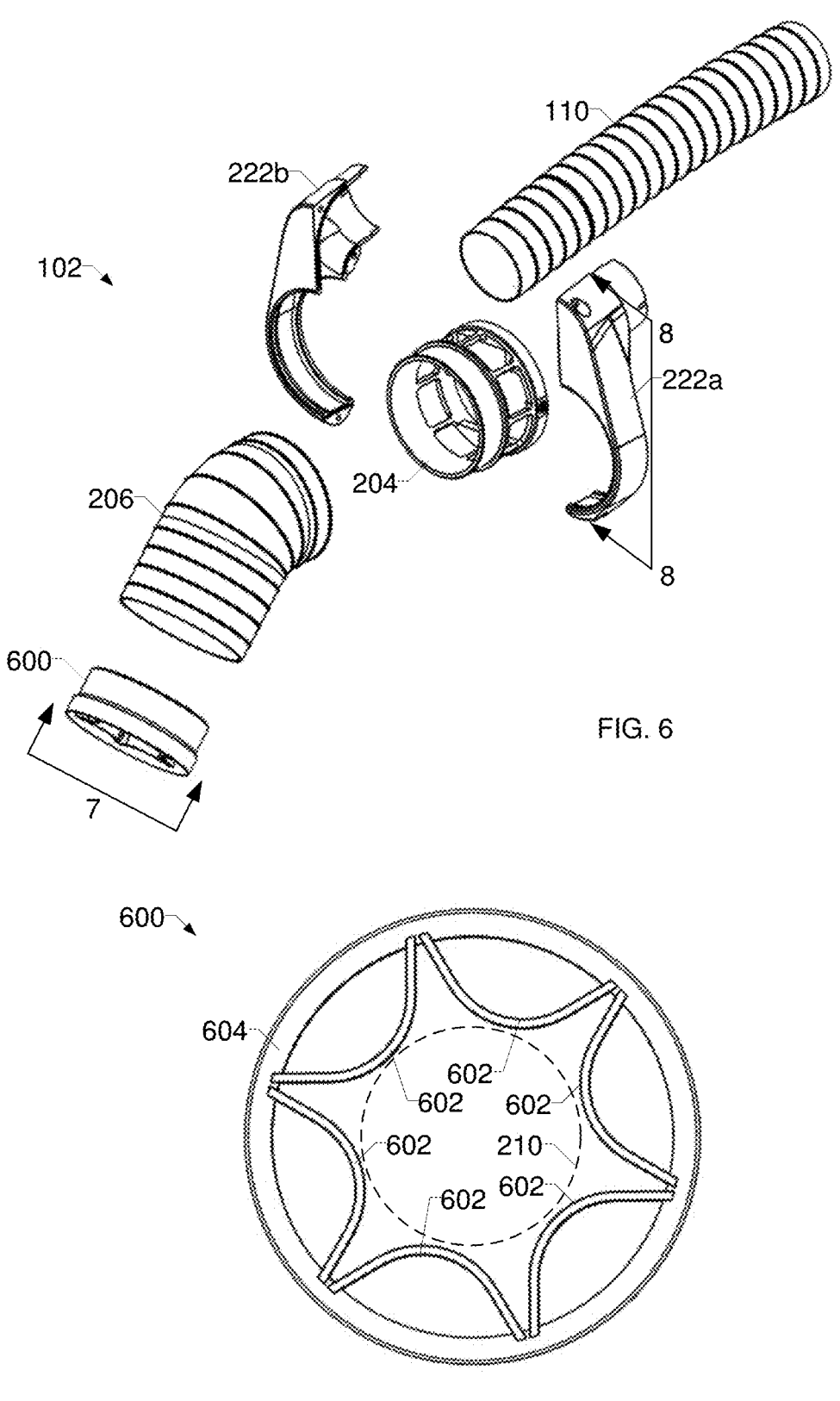
FIG. 6 is an exploded view of the example intermediate mount, fume manifold, fume hose, fume duct, and fume collection shroud.
FIG. 7 illustrates a plan view of the example fume collection shroud of FIG. 6.

FIG. 6 is an exploded view of the example intermediate mount 204, the fume manifold 208, the fume hose 110, and the fume duct 206. In the example of FIG. 6, the fume extraction system 102 further includes a fume collection shroud 600. FIG. 7 illustrates a plan view of the example fume collection shroud 600 of FIG. 6. The fume collection shroud 600 is positioned within an annulus between the fume duct 206 and the neck 210 of the welding torch 104. The example fume collection shroud 600 may include vanes 602, or baffles, which may retain the fume duct 206 in a concentric position with the neck 210 of the welding torch 104 and/or reduce turbulence of airflow entering the fume duct 206 via the fume collection shroud 600. The shroud 600 further includes a ring-shaped frame 604 which is attached to an end of the fume duct 206.

The example fume duct 206 and the fume collection shroud 600 are constructed of flexible and resilient materials to both maintain the shape of the fume duct 206 and the fume collection shroud 600 and to deflect in the event of a collision between the torch 104 and an external object. By using flexible and resilient materials, the fume duct 206 and the fume collection shroud 600 resume their preformed shapes after removal of the encroaching object(s). Example materials may include formed rubber, and/or the fume duct 206 may be constructed using a preformed spring wrapped in a fabric or other material that is flexible and resistant to welding-related heat and flame.

As further shown in FIG. 6, the fume manifold 208 may include multiple pieces 222a, 222b, which are fastened together around the intermediate mount 204. The example pieces 222a, 222b are generally symmetric. In other examples, the fume manifold 208 may include pieces that are asymmetric, or may include a single piece that is connected to the intermediate mount 204 by snapping or other connection.

In some examples, the interface between the fume manifold 208 and the intermediate mount 204 may have one or more detents 226 spaced around a circumference of the intermediate mount 204. For example, detents 226 may retain a relative position between the fume manifold 208 and the intermediate mount 204 when less than a threshold rotational force exists or is applied between the fume manifold 208 and the intermediate mount 204. When more than the threshold rotational force is applied, the resistance provided by the detent(s) 226 may be overcome, allowing the fume manifold 208 to rotate with respect to the intermediate mount 204 (e.g., as the torch neck rotates).

Figure 8:
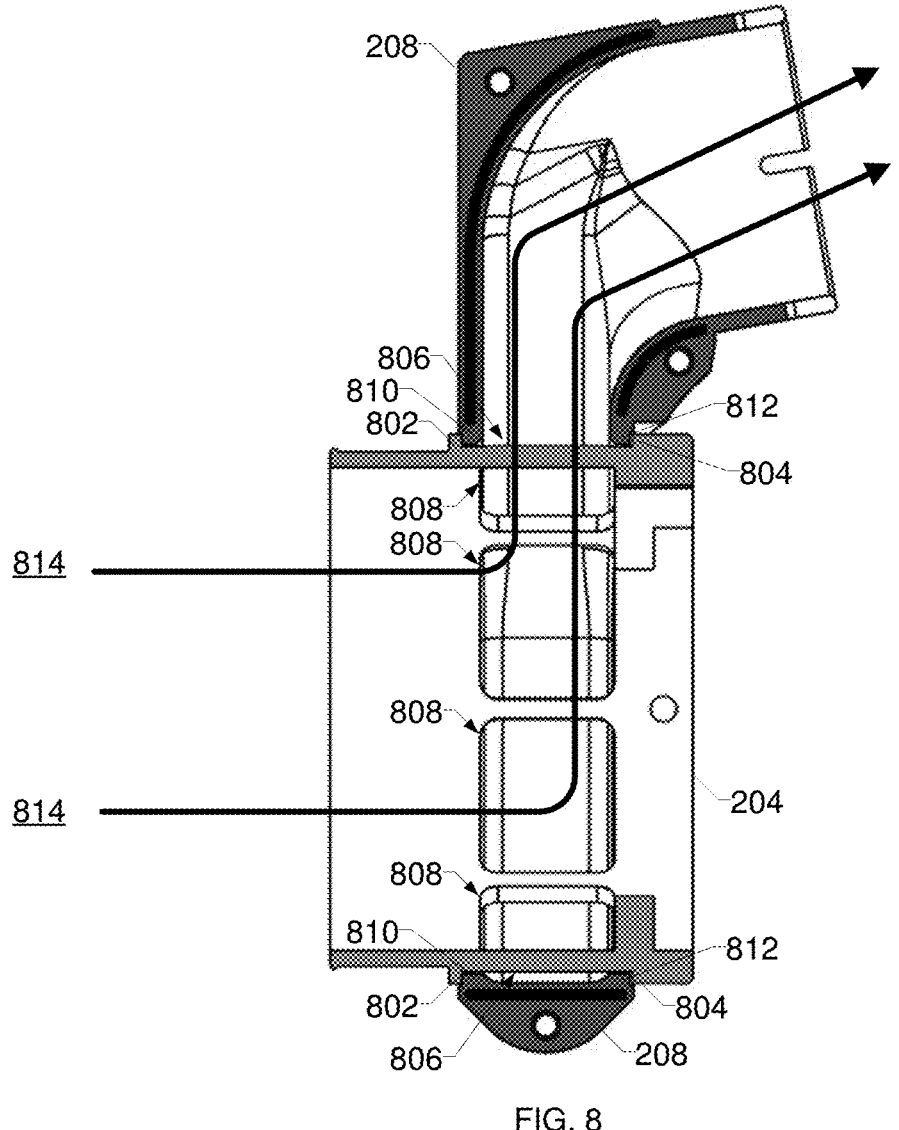
FIG. 8 is a cross-sectional view of the example intermediate mount and fume manifold of FIG. 2A, illustrating the rotational coupling and fume capture flows.

FIG. 8 is a cross-sectional view of the example intermediate mount 204 and fume manifold 208 of FIG. 2A, illustrating the rotational coupling and fume capture flows. As shown in FIG. 8, the example intermediate mount 204 includes opposing flanges 802, 804 (or other abutting surface), which form a circumferential channel 806. The intermediate mount 204 includes openings or ports 808 positioned between the flanges 802, 804 and spaced circumferentially around the intermediate mount 204.

The pieces 222a, 222b of the fume manifold 208 are attached and positioned within the channel 806, such that the intermediate mount 204 is free to rotate within the fume manifold 208. For example, the fume manifold 208 includes flanges 810, 812, which oppose the flanges 802, 804 of the intermediate mount 204 to retain the fume manifold 208 on the intermediate mount 204 as the intermediate mount 204 rotates relative to the fume manifold 208.

Based on a relative rotational position between the fume manifold 208 and the intermediate mount 204, the intermediate mount 204 and the fume manifold 208 direct fumes from the fume duct 206 to the fume hose 110 via one or more of the openings 808, and block others of the openings 808 via the fume manifold 208. Example airflows 814, which may entrain fume for transportation to the fume hose 110 and fume capture system 108, are illustrated in FIG. 8.

Figure 2B:
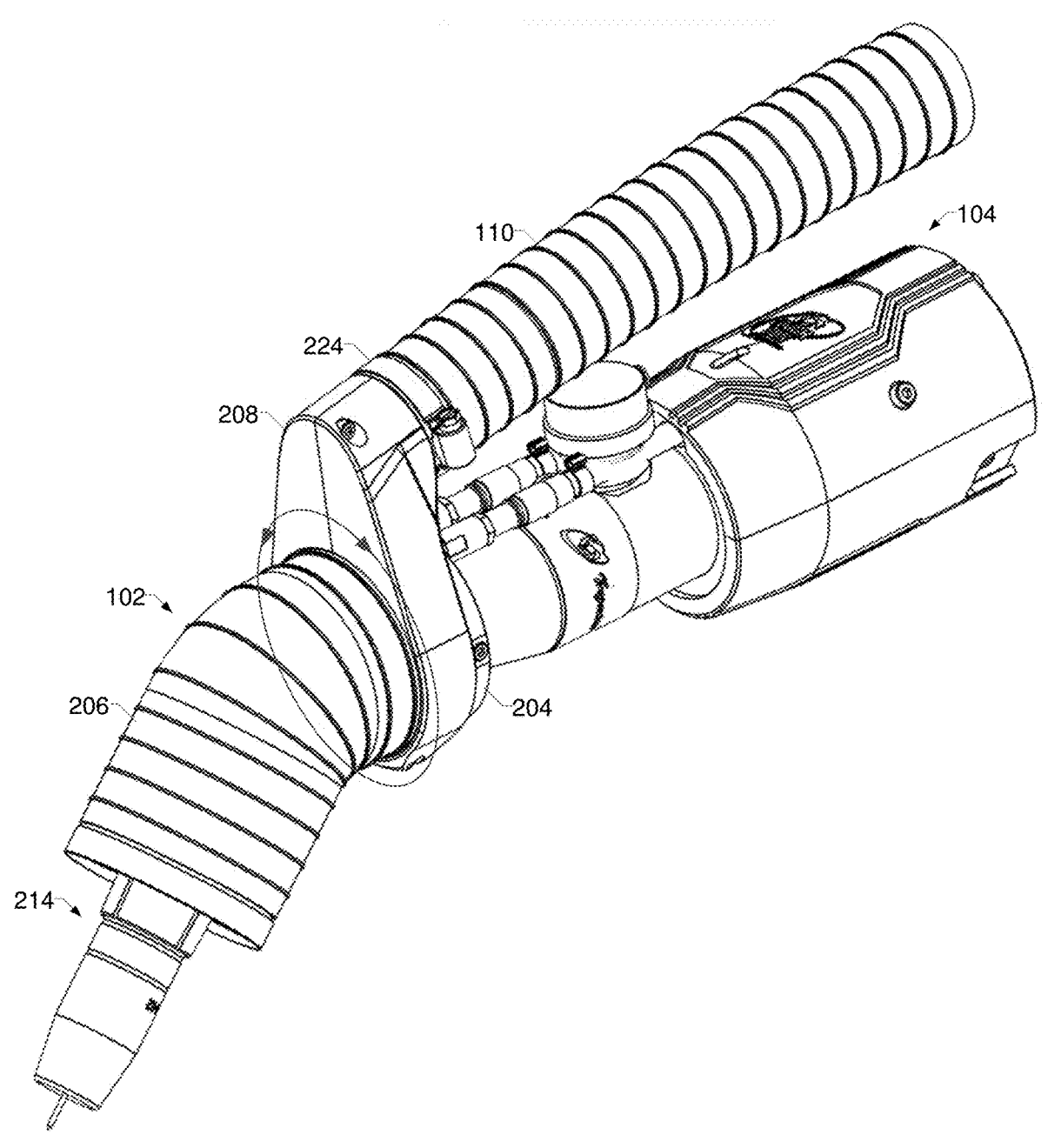
FIG. 2B illustrates another example of the fume extraction system in which the fume hose is retained on the fume manifold via a hose clamp.

In the example of FIG. 2A, the example fume hose 110 is retained by clamping between the pieces 222a, 222b. FIG. 2B illustrates another example of the fume extraction system 102 in which the fume hose 110 is retained on the fume manifold 208 via a hose clamp 224. In other examples, the fume hose 110 may be connected to the fume manifold 208 using a quick connector, and/or any other hose retention technique, which may depend on the material of the fume hose 110 and/or the connection type of the fume manifold 208.

In some examples, the fume manifold 208 is a rigid material. In other examples, all or part of the fume manifold 208 may be constructed out of rubber or other flexible or semi-rigid material to mitigate the effect of collisions between the fume manifold 208 and external objects. In some such examples, the fume manifold 208 may have a rigid bushing or bearing at the interface between the fume manifold 208 and the intermediate mount 204 to enable the fume manifold 208 to rotate smoothly and/or consistently over the intermediate mount 204. Additionally or alternatively, the fume manifold 208 may have a rigid flange or bushing to securely attach the fume hose 110 to the fume manifold 208.

Figure 9:
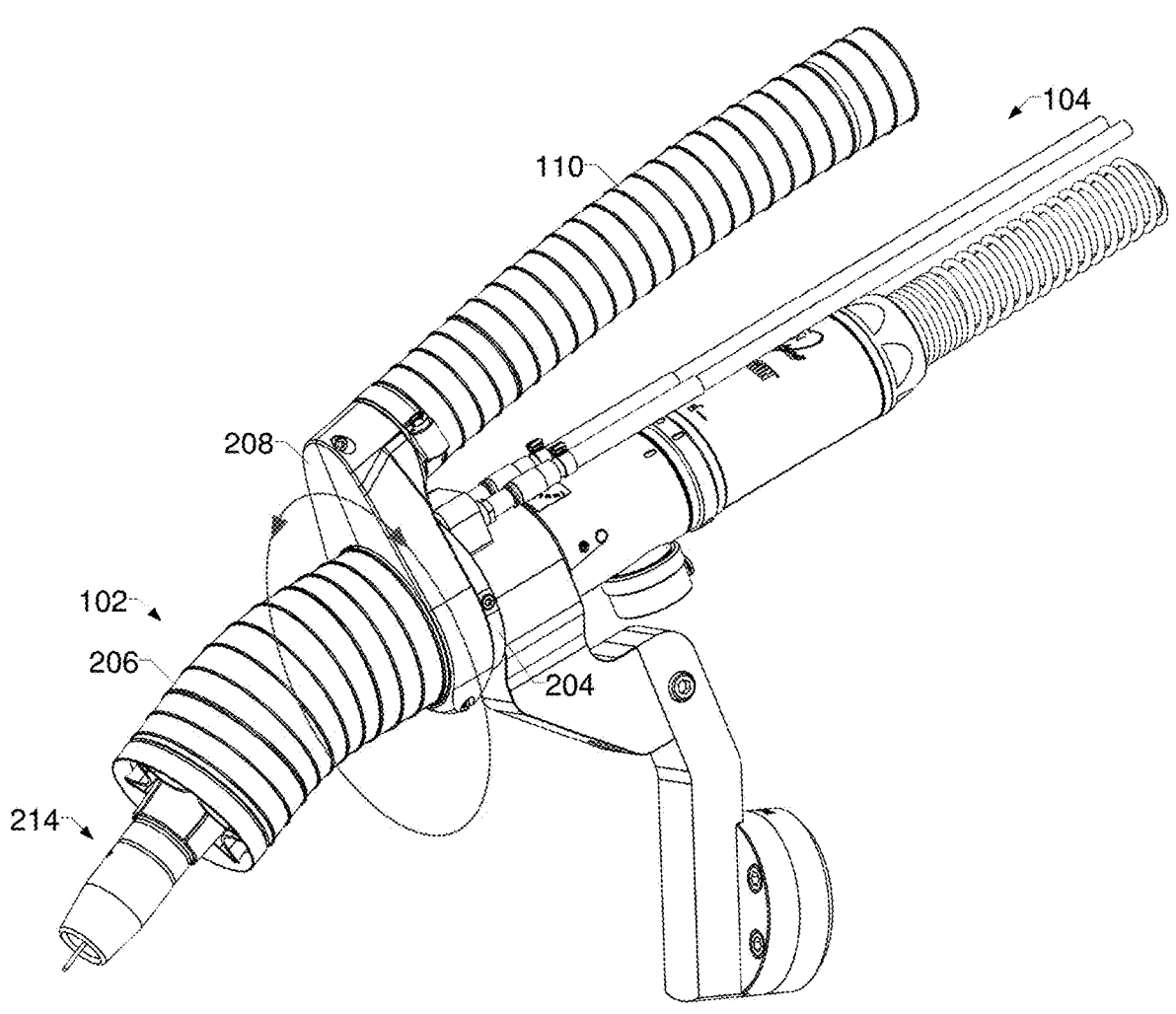
FIG. 9 illustrates an example implementation of the fume extraction system of FIG. 1 attached to a conventional welding torch, in accordance with aspects of this disclosure.

While the example of FIGS. 1-8 illustrates a through-arm implementation, the example fume extraction system 102 may be attached to conventional-type robotic welding torches, in which the electric, wire feeding, and/or gas hoses and cables are routed externally from the robotic manipulator. FIG. 9 an example implementation of the fume extraction system 102 of FIG. 1 attached to a conventional welding torch. Conventional-type robotic welding torches generally have a limited rotational range to avoid stressing the welding hoses and cables. Accordingly, the fume extraction system 102 has a greater range of rotation than the robotic welding torch to which the fume extraction system 102 is attached in FIG. 9. As in the example of FIG. 2B, the fume hose 110 is connected to the fume manifold 208 using a hose clamp 224.

Figures 10, 11:
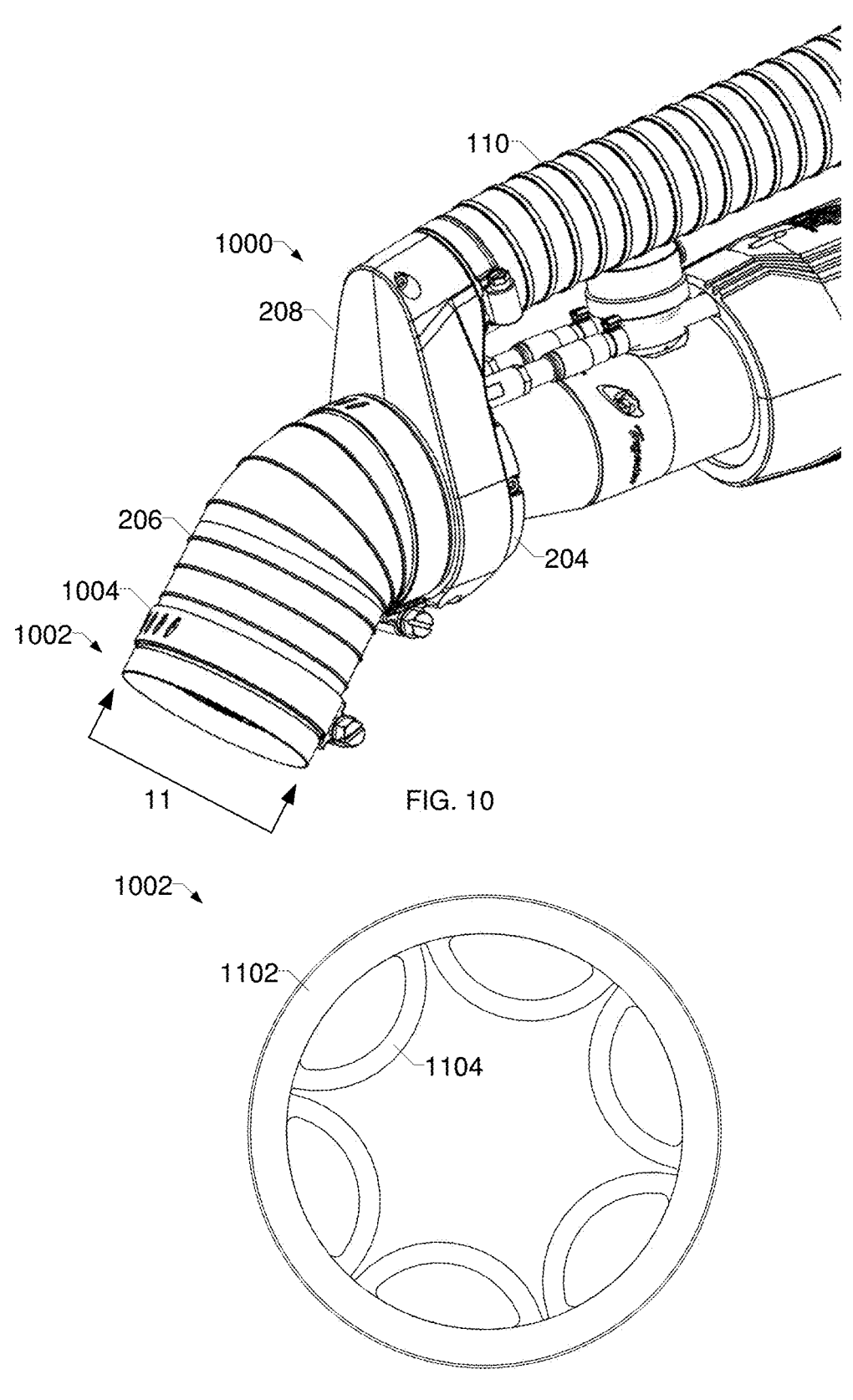
FIG. 10 is illustrates another example fume extraction system including the example intermediate mount, fume manifold, fume hose, and fume duct of FIG. 2A, and another example fume collection shroud.
FIG. 11 illustrates a plan view of the example fume collection shroud of FIG. 10.

FIG. 10 is illustrates another example fume extraction system 1000 including the example intermediate mount 204, fume manifold 208, fume hose 110, and fume duct 206 of FIG. 2A, and another example fume collection shroud 1002. FIG. 11 illustrates a plan view of the example fume collection shroud 1002 of FIG. 10, and FIG. 12 illustrates an exploded view of the fume collection shroud 1002.

Figure 12:
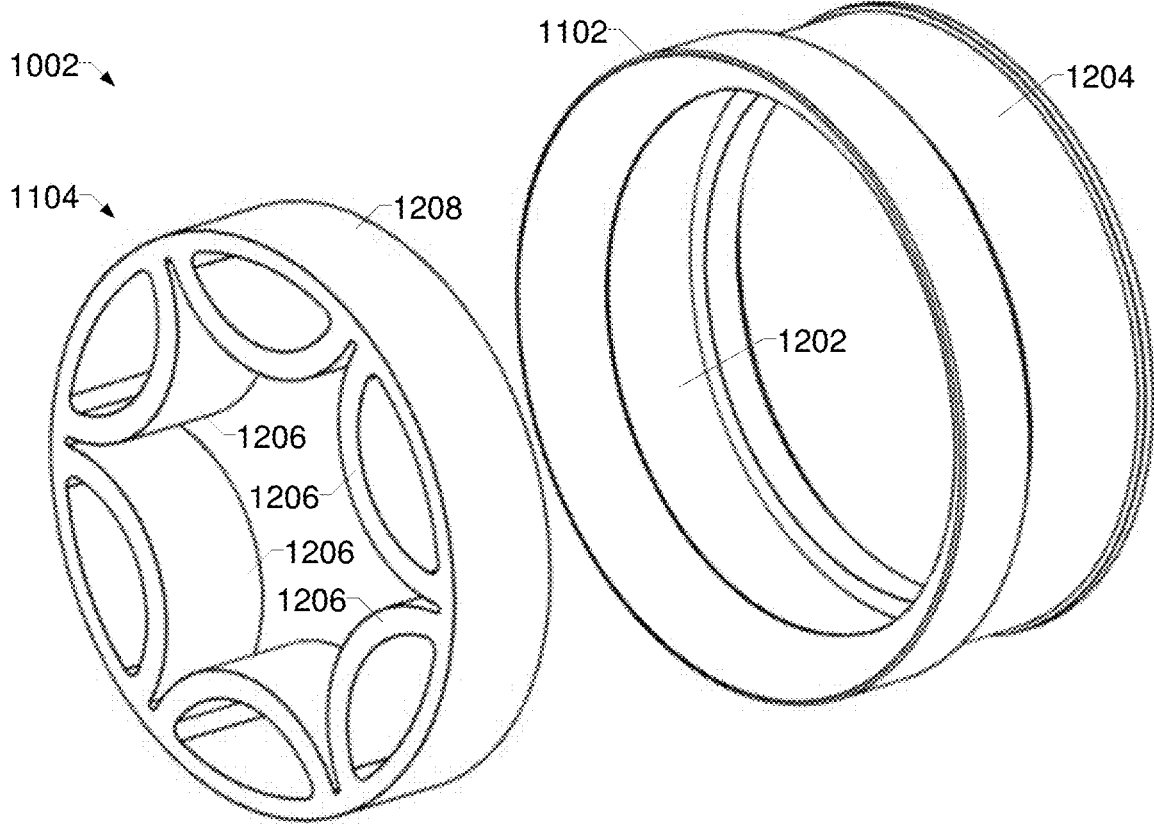
FIG. 12 is an exploded view of the example fume collection shroud of FIGS. 10 and 11.

As illustrated in FIGS. 11 and 12, the example fume collection shroud 1002 of FIG. 10 includes a rigid frame ring 1102 and an inner centering bumper 1104. The rigid frame ring 1102 includes an inner channel 1202 into which the inner centering bumper 1104 is inserted. The rigid frame ring 1102 further includes an outer channel 1204. The fume duct 206 is attached to the fume collection shroud 1002 at the outer channel 1204, such as by securing the fume duct 206 in the outer channel 1204 by a hose clamp 1004 (FIG. 10) or other clamp, fastener, or other attachment technique.

The inner centering bumper 1104 is constructed using a flexible rubber (e.g., silicone rubber), plastic, sheet metal, or other flexible and resilient material. The bumper 1104 includes multiple cushion sections 1206 distributed around the inner diameter of a bumper ring 1208. The bumper ring 1208 fits securely into the inner channel 1202 of the rigid frame ring 1102.

When installed on a welding torch, a nozzle assembly and neck of the welding torch extends through the center of the cushion sections 1206. In the event of a collision between the fume collection shroud 1002 and another object, the rigid frame ring 1102 causes the entire fume collection shroud 1002 to shift with respect to the nozzle. To reduce or prevent damage to the nozzle assembly, neck, welding torch, and/or robot caused by such a collision, the cushion sections 1206 of the bumper 1104 deflect to absorb contact with the nozzle. For example, one, two, or more of the cushion sections 1206 resiliently deform in response to an external force applied to the rigid frame ring. The fume collection may continue to operate and collect fume using the remaining available area of the bumper 1104.

Due to the rigid frame ring 1102, the cross-sectional area of front orifice remains constant so collisions and/or nozzle rotation do not restrict fume collection. The curved arches of the cushion sections 1206 both center the front end around the neck and will consistently buckle or collapse when subject to threshold amount of external force. When the force is removed, the cushion sections 1206 then return to their original positions.

The flexibility provided by the rigid frame ring 1102 and the inner centering bumper 1104 results in more forgiveness and/or mitigates the consequences of collisions between the fume collection shroud 1002 (the most likely point of collision in many installations) and external objects. By implementing the example fume extraction system 1000 of FIGS. 10-12 into existing welding installations, less reprogramming is required to avoid significant collisions and/or damage to welding equipment, relative to conventional fume extraction installations.

Figure 13:
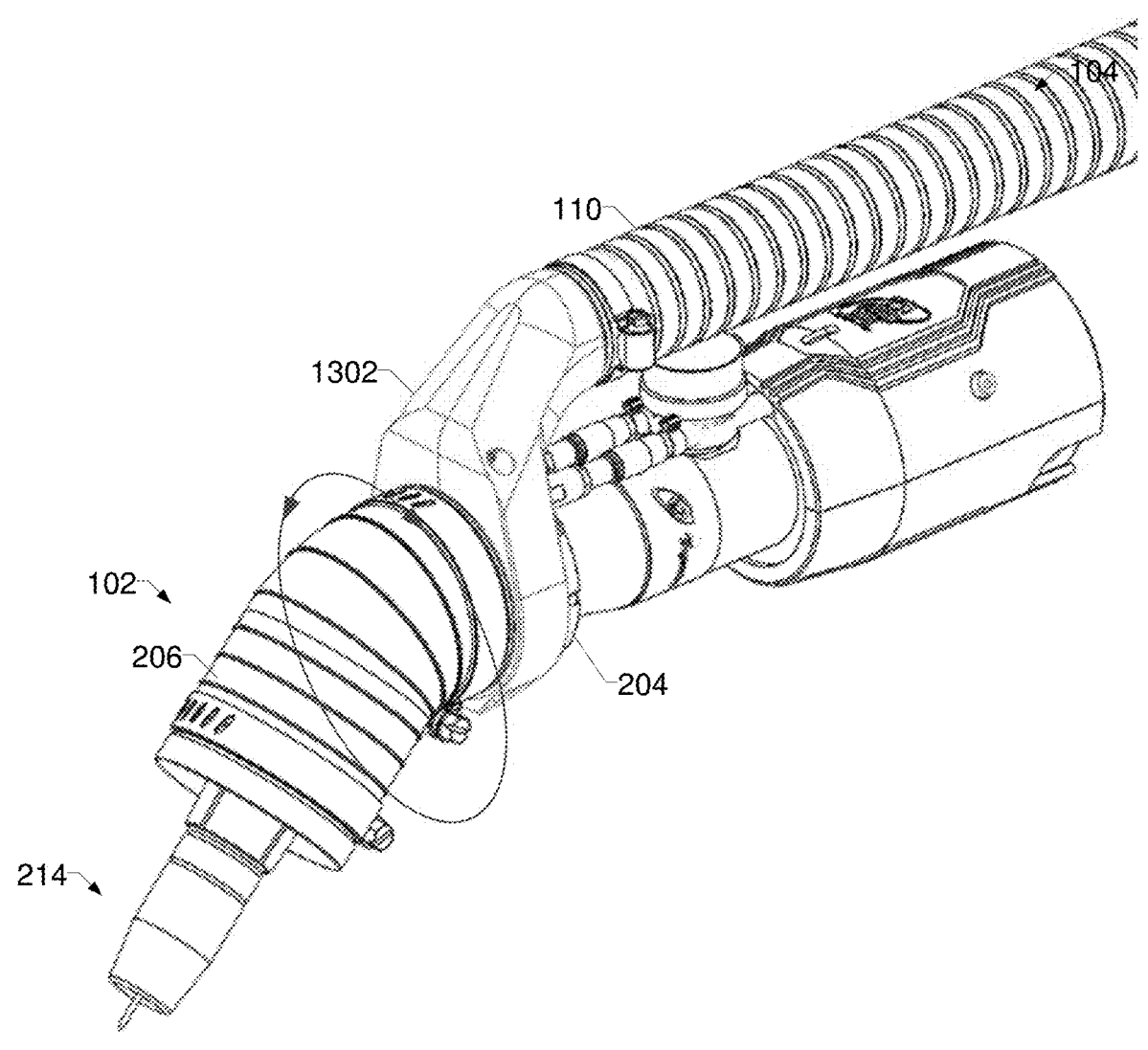
FIG. 13 illustrates another example implementation of the fume extraction system of FIG. 1 attached to a conventional welding torch, in accordance with aspects of this disclosure.

FIG. 13 illustrates another example implementation of the fume extraction system 102 of FIG. 1 attached to a conventional welding torch. The example fume extraction system 102 of FIG. 9 includes the intermediate mount 204, the fume hose, the fume duct 206, and the nozzle assembly 214. The example fume extraction system 102 further includes a fume manifold 1302 (e.g., in place of the fume manifold 208 of FIG. 9) rotationally coupled to the intermediate mount 204 and connected to the fume hose 110 in the same manner(s) as disclosed above with reference to the fume manifold 208. The fume manifold 1302 may be constructed using the same materials as the fume manifold 208.

Figures 14, 15:
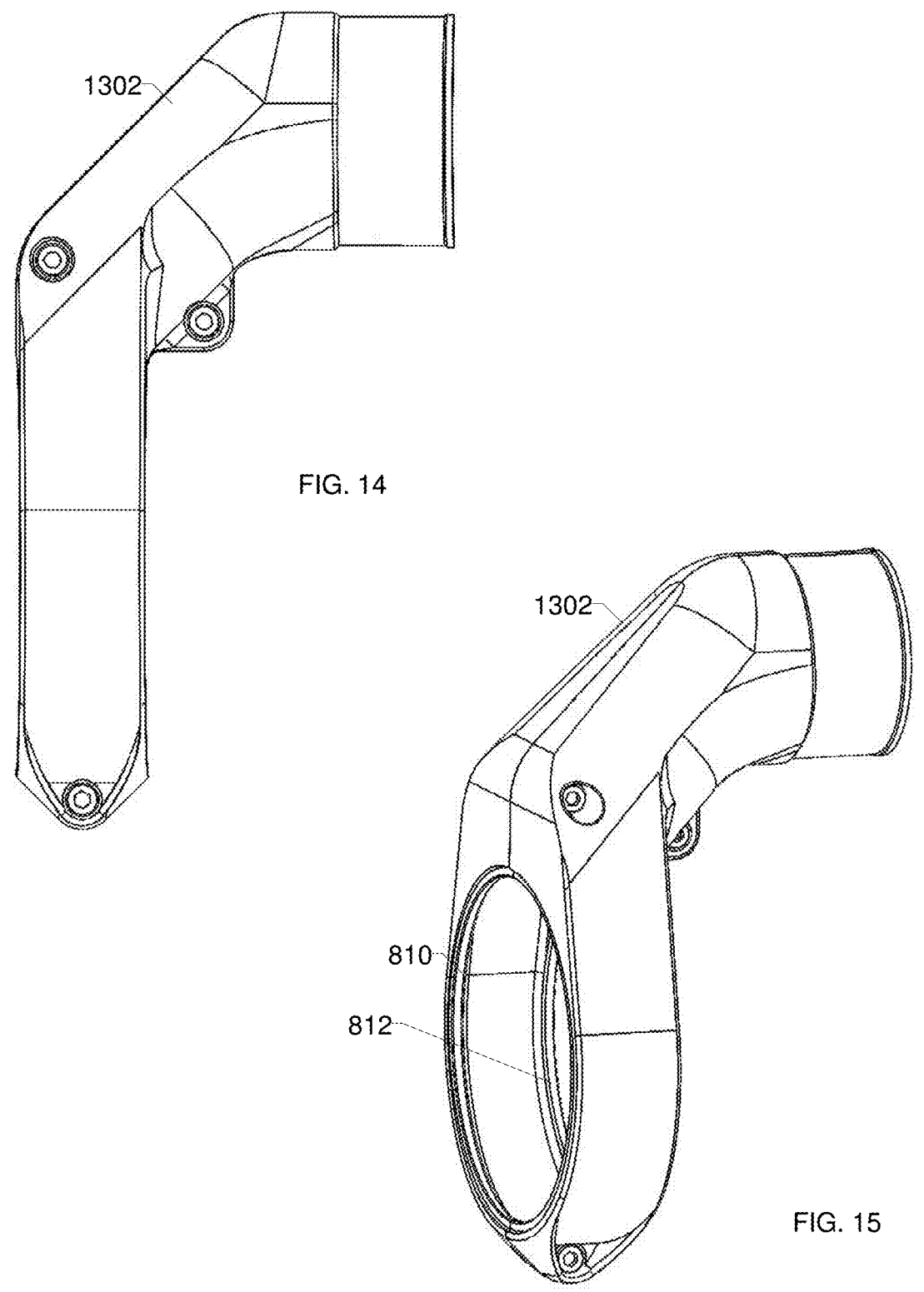
FIG. 14 is a side view of the example fume manifold of FIG. 13.
FIG. 15 is a perspective view of the example fume manifold of FIG. 13.

FIG. 14 is a side view of the example fume manifold 1302 of FIG. 13. FIG. 15 is a perspective view of the example fume manifold 1302 of FIG. 13. The passage of the fume manifold 1302 that directs captured fume from the intermediate mount 204 to the fume hose 110 is angled further away from the nozzle assembly 214 relative to the example fume manifold 208 of FIG. 8. The example fume manifold 1302 provides improved access by the welding torch to the weld (e.g., increased range of angles) and/or less likelihood of collision between the fume extraction system 102 and external objects, such as a workpiece, fixturing, or welding table. Further, the fume manifold 1302 may include flanges 810, 812 similar to the flanges 810, 812 of FIG. 8, which oppose the flanges 802, 804 of the intermediate mount 204 to retain the fume manifold 1302 on the intermediate mount 204 as the intermediate mount 204 rotates relative to the fume manifold 1302.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A fume extractor for a robotic welding torch, the fume extractor comprising:
   a neck clamp configured to attach to a neck of a robotic welding torch;
   an intermediate mount rigidly attached to the neck clamp so that the neck clamp is positioned between the intermediate mount and the neck;
   a fume duct coupled to the intermediate mount and extending over the neck of the robotic welding torch toward a nozzle of the robotic welding torch; and
   a fume manifold rotationally coupled to the intermediate mount and coupled to a fume hose, wherein the fume manifold, the intermediate mount, and the fume duct are configured to communicate a negative pressure from the fume hose to an end of the fume duct closest to the nozzle of the robotic welding torch.

2. The fume extractor as defined in claim 1, wherein the neck clamp is configured to rotate, and induce corresponding rotation of the intermediate mount and the fume duct, in response to rotation of the neck of the robotic welding torch.

3. The fume extractor as defined in claim 2, wherein the neck clamp, the intermediate mount, and the fume duct are capable of rotation of more than 360 degrees with respect to the fume manifold.

4. The fume extractor as defined in claim 1, wherein the robotic welding torch comprises a through-arm robotic welding torch in which weld cables coupled to the robotic welding torch are routed at least partially through an interior of a robotic welding arm.

5. The fume extractor as defined in claim 1, wherein the robotic welding torch comprises weld cables coupled to the robotic welding torch and routed on an exterior of a robotic welding arm.

6. The fume extractor as defined in claim 1, wherein the fume duct extends from the intermediate mount around the bend in the neck toward the nozzle of the robotic welding torch.

7. The fume extractor as defined in claim 1, wherein the fume duct is concentric to the neck of the robotic welding torch.

8. The fume extractor as defined in claim 1, wherein the fume duct is configured to deflect in response to a collision between the fume duct and an external surface, and to return to a predefined shape when the external surface is removed.

9. The fume extractor as defined in claim 1, wherein the neck clamp comprises one or more openings for fluid lines to pass through the neck clamp.

10. The fume extractor as defined in claim 1, wherein the neck clamp comprises two or more pieces configured to be attached together to clamp to the neck of the robotic welding torch.

11. The fume extractor as defined in claim 1, further comprising a fume collection shroud positioned within an annulus between the fume duct and the neck of the welding torch.

12. The fume extractor as defined in claim 11, wherein the fume collection shroud is configured to retain the fume duct in a concentric position with the neck of the welding torch.

13. The fume extractor as defined in claim 11, wherein the fume collection shroud comprises a plurality of vanes or baffles configured to reduce turbulence of airflow entering the fume duct via the fume collection shroud.

14. The fume extractor as defined in claim 11, wherein the fume collection shroud comprises a rigid frame ring and an inner centering bumper.

15. The fume extractor as defined in claim 1, wherein an interface between the intermediate mount and the fume manifold comprises one or more detents, and the fume manifold is configured to overcome resistive force applied by the detent to rotate with respect to the intermediate mount when at least a threshold rotational force is applied between the intermediate mount and the fume manifold.

16. The fume extractor as defined in claim 1, wherein the fume manifold comprises a flexible or semi-rigid material.

17. The fume extractor as defined in claim 16, wherein the fume manifold comprises a rigid flange or bushing to interface with the intermediate mount.

18. The fume extractor as defined in claim 16, wherein the fume manifold comprises a rigid flange or bushing to interface with the fume hose.

19. A fume extractor for a robotic welding torch, the fume extractor comprising:
   a neck clamp configured to attach to a neck of a robotic welding torch;
   an intermediate mount rigidly attached to the neck clamp;
   a fume duct coupled to the intermediate mount and extending over the neck of the robotic welding torch toward a nozzle of the robotic welding torch; and
   a fume manifold rotationally coupled to the intermediate mount and coupled to a fume hose, wherein the fume manifold, the intermediate mount, and the fume duct are configured to communicate a negative pressure from the fume hose to an end of the fume duct closest to the nozzle of the robotic welding torch,
   wherein the intermediate mount comprises a plurality of circumferentially spaced openings, the fume manifold configured to, based on a relative rotational position between the fume manifold and the intermediate mount, direct fume to the fume hose via one or more of the openings and obstruct others of the openings.

20. A fume extractor for a robotic welding torch, the fume extractor comprising:
   a neck clamp configured to attach to a neck of a robotic welding torch;
   an intermediate mount rigidly attached to the neck clamp;
   a fume duct coupled to the intermediate mount and extending over the neck of the robotic welding torch toward a nozzle of the robotic welding torch;
   a fume manifold rotationally coupled to the intermediate mount and coupled to a fume hose, wherein the fume manifold, the intermediate mount, and the fume duct are configured to communicate a negative pressure from the fume hose to an end of the fume duct closest to the nozzle of the robotic welding torch; and a fume collection shroud positioned within an annulus between the fume duct and the neck of the welding torch, wherein the fume collection shroud comprises a rigid frame ring and an inner centering bumper, wherein the inner centering bumper comprises a plurality of cushion sections spaced about an inner diameter of the inner centering bumper, wherein the plurality of cushion sections resiliently deform in response to an external force applied to the rigid frame ring.

* * * * *